United States Patent [19]

Shenq-Gwo

[11] Patent Number: 4,929,031
[45] Date of Patent: May 29, 1990

[54] STRUCTURE OF HUB CAP FOR CAR WHEEL

[76] Inventor: Liou Shenq-Gwo, P.O. Box 96-405, Taipei 10098, Taiwan

[21] Appl. No.: 274,339

[22] Filed: Nov. 21, 1988

[51] Int. Cl.$^5$ .............................................. B60B 7/00
[52] U.S. Cl. .............................. 301/37 P; 301/37 PB
[58] Field of Search .................. 301/37 R, 37 P, 37 C, 301/37 TP, 37 PB

[56] References Cited

U.S. PATENT DOCUMENTS

| | | | |
|---|---|---|---|
| 2,082,803 | 6/1937 | Lyon | 301/37 R |
| 4,547,021 | 10/1985 | Abbate Daga | 301/37 P |
| 4,709,967 | 12/1987 | Saskamoto | 301/37 P |

FOREIGN PATENT DOCUMENTS

| | | | |
|---|---|---|---|
| 0247330 | 12/1987 | European Pat. Off. | 301/37 PB |
| 0271038 | 12/1987 | European Pat. Off. | 301/37 PB |

Primary Examiner—Russell D. Stormer

[57] ABSTRACT

An improved structure of hub cap for a car wheel is featured with grooves on the inner sides of a plurality of click sheets respectively. A metal ring fitted against the inner sides of the click sheets; both ends of the metal ring are respectively encased with rubber caps on two opposite click sheets. The hub cap can effectively be installed into the wheel rim with proper flexibility in a detachable manner.

1 Claim, 1 Drawing Sheet

STRUCTURE OF HUB CAP FOR CAR WHEEL

BACKGROUND OF THE INVENTION

1. Field of the Invention

The present invention relates to the structure of a hub cap of car wheel; particularly, it relates to the improved structure of the hub cap which can easily be installed and removed.

2. Description of the Prior Art

According to the conventional skills, the structure of the hub cap of a wheel is mainly installed with some click flange bodies in equal spacings at the edges of the click ring and base body which is installed on the cover. Within one click flange, one pair of click holes is equipped which provides a click sheet in metal with its tail end slightly bending outward. One pair of the clicks is fixed in the click holes. When they are in use, the click sheet is squeezed in the connection place of the circular arc click at the inner edge of the car's wheel rim in order to make firmly catching in the click hole.

However, the structure of the above hub cap has the following disadvantages, namely:

1. When the hub cap is installed to or dismantled from the wheel, the heavy force is to be applied to the click sheet and the connection where the click sheet is squeezed with the circular arc of the inner edge of wheel rim for catching or disengagement. As the click sheet and the wheel rim catch for the connection are all made of metal material, they would rub each other with scratches on them when they are installed or dismanteled; as a result, the stability and good appearance of the click sheet will be affected.

2. Since the click sheet is made of metal, it can be squeezed into the wheel rim firmly without loosening or falling off. As the click sheet is jammed into the rim in the fixed manner, that would cause damage to the sheet which can not be replaced. That would waste the money.

3. As the metal click sheet has the strength but it lacks its flexibility; it would spend a lot of effort to push it into the wheel rim. When it is to be removed from the wheel rim, it would cause the user to have much inconvenience.

4. Since the metal click sheet lacks flexibility, it easily bends and suffers damage when it is pushed forwards into the wheel rim, causing the loosening of the hub cap. At that time, the click sheets are likely to fly out of the wheel rim to cause hazard.

In the conventional hub cap, the main feature is that, in the cap, there install a plurality of click sheets at regular spacing. In the click sheet, there is a groove in straight line manner for the placement of outer supporting ring. In the circumference of the outer supporting ring, there install outer convex bodies of the equal spacing. The outer convex body is inserted, one by one, into the click sheet which is jammed and made firmly by the click body.

The drawback of such conventional hub cap structure is that the outer supporting ring should be in line with the position of the click sheet, and then it is pushed into the connection place one by one. That would waste time, and it also requires the application of the force to push it into the connection which shows the design cause a user to waste time and effort.

SUMMARY OF THE INVENTION

This invention aims at the improvement of the known skill in the making of the hub cap. Its main purpose is to provide a kind of wheel rim which is convenient to install and dismantle.

Another purpose of this invention is to provide a kind of hub cap with less components to reduce the cost.

A further object of the present invention is to provide a plurality of click sheets, which can be loaded and unloaded for many times without any loss of its catching stability.

Hence, the main feature of the present invention is to provide a flexible ring insert, which is bendable for user's convenience to mount or dismount the hub cap.

The next feature of the present invention is its cost saving and practical in use.

The next feature of the present invention is the flexible ring insert which can readily and conveniently be fitted into the groove of the inner edge of the click sheet for mounting or dismounting to make the friction reduced to the minimum without affecting the stability of its catching.

DESCRIPTION OF THE PREFERRED EMBODIMENT

Figure 1B:
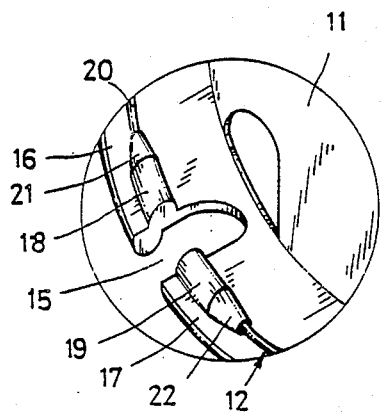
FIG. 1 is a perspective view of an embodiment according to the present invention.
Figure 1A:
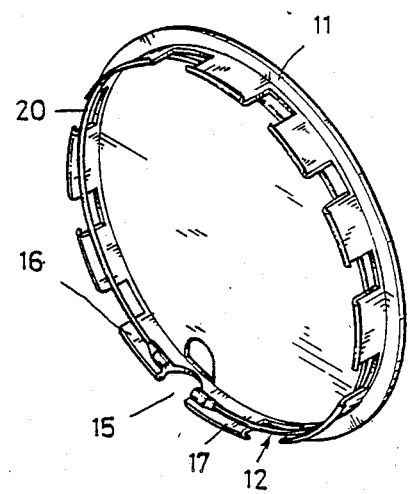
Figure 2:
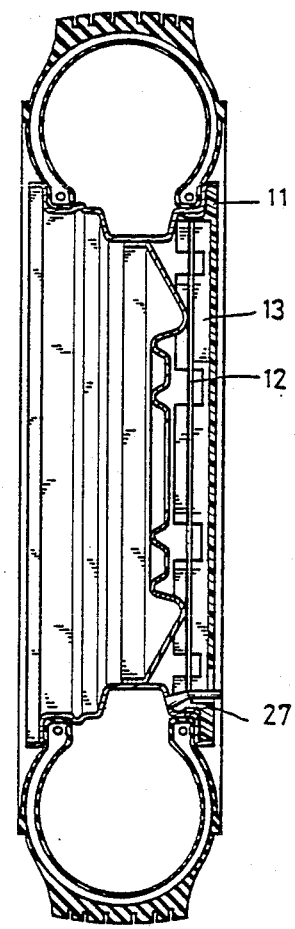
FIG. 2 is a sectional view of the present invention, being mounted on a wheel.
Figure 3:
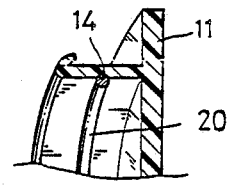
Figure 4:
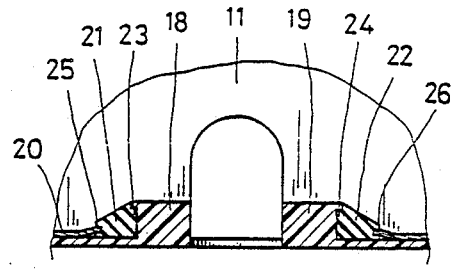

The present invention relates to an improvement on the structure of hub cap for car wheel as shown in FIGS. 1 and 2; its main components comprise of one hub cap 11 and a flexible ring insert 12. The hub cap 11 is provided with a plurality of click sheets 13 which are generally twelve sheets. The inner side of each of the click sheets 13 is provided with a groove 14. The depth of the groove is about the half of the diameter of the metal ring 20 for the placement of the ring insert 12 into the groove 14 to prevent it from displacement.

There is a notch 15 between the two click sheets 16 and 17 at the proper place among the click sheets 13. The click sheets 16 and 17 on the two sides of the notch 15 are installed with two flanges 18 and 19 respectively which are used for the insertion of the ends of the ring inserts 12.

For the placement of the flexible ring inserts 12, a metal ring 20, which is flexible and bendable, has two ends to be encased in rubber caps 21 and 22 respectively. The two ends of the metal ring are respectively inserted into the round holes 25 and 26 of the rubber caps in one half depth of that holes. The connection between the rubber caps 21 and 22 and positioning flanges 18 and 19 is to be dine with positioning holes 23 and 24 in positioning flanges 18 and 19 respectively.

The positioning flanges 18 and 19 provided on the hub cap are for the insertion of the rubber caps 21 and 22. At the same time, the two ends of the flexible ring insert 12 are to be fitted into the round holes 25 and 26 of the rubber caps 21 and 22 respectively, and then the flexible ring insert 12 is pushed into a groove 14 inside the click sheets 13 to prevent from displacement. As the end of the ring insert 12 is affected by the flexibility of the rubber caps 21 and 22, the flexible ring insert 12 has a suitable flexibility so that the click sheets 13 of the hub cap 11 would also have some flexibility. When the hub cap is mounted on the wheel rim edge 27, it can be fastened in place properly.

The present invention has the following advantages:

1. Its installation can be done easily and quickly because both ends of the flexible ring insert are respectively installed with the flexible rubber caps. The insert will firmly be caught along the groove at the inner side of the click sheets to achieve the fast installation of the hub cap.

2. The present invention has less components so that the manufacturing cost thereof will be reduced.

3. Less friction can be achieved because of the present invention being made of non-metal material, and therefore the click sheets would have better flexibility for easy installation and removal.

According to the above discussion, the present invention is better than the conventional hub cap in terms of economy and practicality.

I claim:

1. A hub cap for car wheel mainly comprising a hub cap and a flexible ring insert;

said hub cap including a plurality of click sheets and a notch; and each of said click sheets having a flange end to be retained under the flange of a wheel rim edge, and each said click sheet having a groove in the inner side thereof for retaining a section of said flexible ring insert; and two click sheets adjacent each side of said notch being furnished with positioning flanges for receiving two ends of said flexible ring insert;

said flexible ring insert including a metal ring having two ends, two rubber caps mounted on two ends of said metal ring; and said rubber caps being positioned in said positioning flanges respectively, and the remainder of said metal ring being mounted in said grooves on the inner side of said click sheets of said hub cap; thereby enabling said hub cap to be mounted on a car wheel flexibly and firmly.

* * * * *